United States Patent [19]

Kaminski

[11] Patent Number: 4,588,066
[45] Date of Patent: May 13, 1986

[54] ARTICLE FEEDING APPARATUS WITH NON-FLEXING BELT

[75] Inventor: Elton G. Kaminski, Sidney, Ohio

[73] Assignee: The Stolle Corporation, Sidney, Ohio

[21] Appl. No.: 634,868

[22] Filed: Jul. 26, 1984

[51] Int. Cl.⁴ .......................................... B65G 35/00
[52] U.S. Cl. ............................. 198/345; 413/8; 198/346.2
[58] Field of Search ............... 198/339, 345, 656, 837, 198/725, 339.1; 29/773; 413/8, 62

[56] References Cited

U.S. PATENT DOCUMENTS

| | | | |
|---|---|---|---|
| 3,557,425 | 1/1971 | Scharf | 29/773 |
| 4,289,231 | 9/1981 | Kaminski | 198/842 |

Primary Examiner—Joseph E. Valenza
Assistant Examiner—Kyle E. Shane
Attorney, Agent, or Firm—Frost & Jacobs

[57] ABSTRACT

An apparatus for feeding a series of like articles from one operating station to the next including a moving endless belt having an aperture slightly larger than the like articles and including a pad positioned beneath the endless belt. Associated with the pad is apparatus to vertically move the pad toward and away from the endless belt.

11 Claims, 3 Drawing Figures

ARTICLE FEEDING APPARATUS WITH NON-FLEXING BELT

BACKGROUND OF THE INVENTION

1. Field of the Invention.

The present invention relates to an article feeding apparatus and in particular to an apparatus which performs successive operations on each article delivered to each of a plurality of operating stations on a non-flexing belt.

2. Prior Art.

U.S. Pat. No. 4,289,231 to Kaminski discloses exemplary problems of prior art endless belts illustrated in FIG. 4a and 4b. As disclosed in the Kaminski reference, the prior art belts are made endless by riveting (FIG. 4b) or welding (FIG. 4a), if metallic, or adhesively securing if non-metallic. In order to provide accurate indexing of the belt as disclosed in FIGS. 4a and 4b, holes 12 are provided along each edge of the belt which mate with corresponding sprocket spikes on a pair of rotational drums. As stated in U.S. Pat. No. 4,289,231, a number of problems occurred with this belt particularly including failure due to metal fatigue. At that time, Kaminski increased the useful service life of the belt by reducing the bending stress and making it of a non-metallic, yet non-stretchable material, while maintaining the indexing means necessary to assure accurate alignment between the endless belt and the rotating drums so that the article placed upon the endless belt would be accurately positioned at each operation station.

In order to overcome the metal fatigue failure of the endless belts of the prior art apparatus, Kaminski employed a non-metallic non-stretchable belt as illustrated in FIGS. 7-11 of U.S. Pat. No. 4,289,231. The endless belt is made of rubber reinforced with steel wires or cables 46 which are embedded in the rubber material of the belt, so as to yield an endless belt which has a non-metallic exterior surface and yet is unstretchable. Additionally, this new improved belt was equipped with indexing means 42 on the lower surface or inside surface of the loop of the endless belt such that the belt could be properly indexed and aligned at each operational station.

FIGS. 8-11 are a modification of the FIG. 7 device. As illustrated therein, the aperture 50 is a stepped aperture comprising an upper portion 52 and a lower portion 54 so as to form an annular shoulder 56 between the upper and lower portions. The stepped aperture is required to transport a can end, such as illustrated by the reference numeral 48, in order to easily perform certain desired operations at specific operation stations.

During operation of the article feeding apparatus, the articles placed upon the belt, such as the can ends, do not leave the belt apertures. When an operation station includes a lower tool which performs various operations on the article, the belt is flexed downward to place the article on the lower tool. After the operation is completed, the belt is lifted by spring loaded rails such that the article can be transferred without "stumbling" over the lower tool. This procedure works extremely well when the distance of displacement of the belt is kept to a minimum of about ¼-inch.

If the operation to be performed on the article requires substantially more deflection of the belt, the useful life of the belt is greatly reduced and often results in a broken belt if deflection is too great. Additionally, operations are sometimes required at the extreme outer edges of the article and these operations cannot be accomplished by the stepped aperture belts illustrated in FIGS. 7-11 of U.S. Pat. No. 4,289,231 because the thickness of the belt is greatly reduced in order to obtain a stepped aperture. In other words, the lower portion 54, as illustrated in FIG. 10 of the above-mentioned patent, is sufficiently thin that most operations required at the extreme outer edges of the article cannot be accomplished on the endless belt because the belt cannot support the forces placed on its lower portion. Consequently, the belt frequently breaks if such operations are attempted.

Accordingly, a need exists for an endless belt which has an extended useful service life over that of the prior art devices and includes a method of permitting the belt to be displaced significantly more than the traditional ¼-inch. Also, the need exists for an endless belt which is sufficiently strong to permit operations to be performed on the article at the extreme edges of the article without cracking or breaking the belt.

SUMMARY OF THE INVENTION

The present invention comprises an endless belt for intermittently feeding a series of like articles along the endless path so as to present them in succession to a plurality of operation stations where operations are performed upon the articles in sequence. The endless belt includes a plurality of centrally located apertures which are slightly larger than the article positioned on the belt. In order to prevent the article from falling through the aperture, a pad is positioned immediately beneath the belt and is capable of partially closing the aperture of the belt. Accordingly, the article, such as a can end actually rests upon the pad rather than the transfer belt. In turn, the pad is supported upon vertically movable support structure so that the pad may lower the article to any distance desired in order to perform specific operations on the article at each work station. In general, the vertically movable support structure of the pad includes pad actuator pins and a striker bar which acts as a stop means in order to accurately position the pad a specific distance below the endless belt. When the operation is complete, the vertically movable support structure for the pad is raised to a position so that the pad is once again positioned in contact with the lower surface of the endless belt.

In the broadest sense, the invention of the present application comprises an endless belt having centrally located apertures of a size slightly larger than the article transferred by the endless belt, and a corresponding pad positioned beneath the endless belt for contacting the lower surface of the endless belt in its normal position, and during the operational position, the pad is positioned a specified distance below the transfer belt so that specific operations can be performed on the article. Associated with the pad is means to move the pad in a vertical manner toward and away from the endless belt.

DESCRIPTION OF THE PREFERRED EMBODIMENTS

Figure 1:
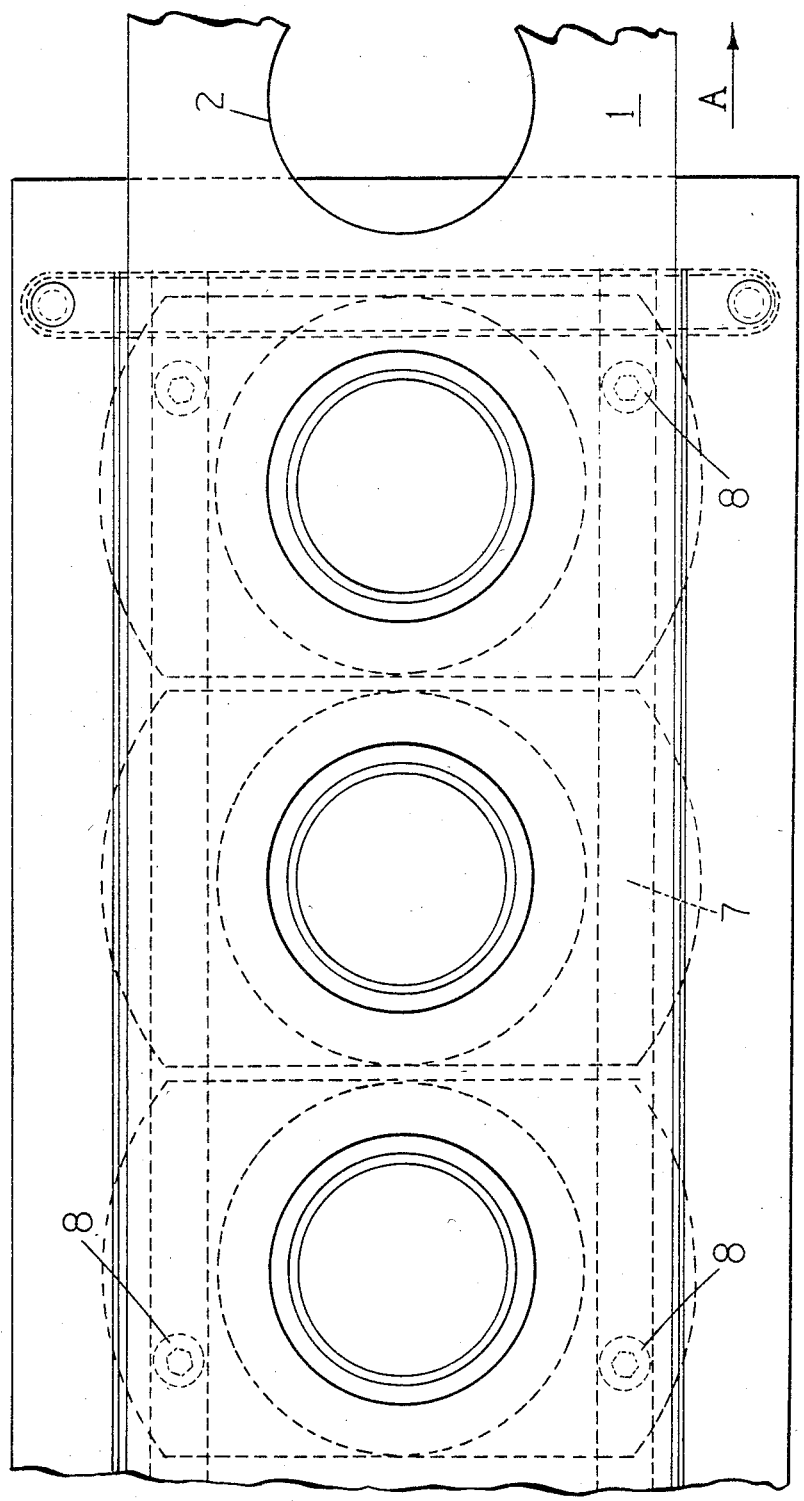
FIG. 1 is a plan view of the endless belt of the present invention.

As illustrated in FIG. 1, reference numeral 1 shows an endless belt which is associated with at least two drums, not shown, which transport the endless belt 1 from operation station to operation station in much the same manner as that described in U.S. Pat. No. 4,289,231. The belt is generally made of a flexible material such as rubber, and has embedded therein steel wires or cables so that the belt is sufficiently flexible to avoid the problem of cracking and breaking as is characterized by metal belts, but is sufficiently strong and rigid in nature to adequately transport the articles and to provide years of lasting service even when tightly stretched around the rotating drums.

The endless belt 1 includes a plurality of article apertures 2 which are centrally located on the endless belt and are in alignment with one another. While the size of the aperture may vary depending upon the article which is carried upon the endless belt, it is desirable to form the article apertures 2 of a size slightly larger than that of the article transported by the belt.

Figure 2:
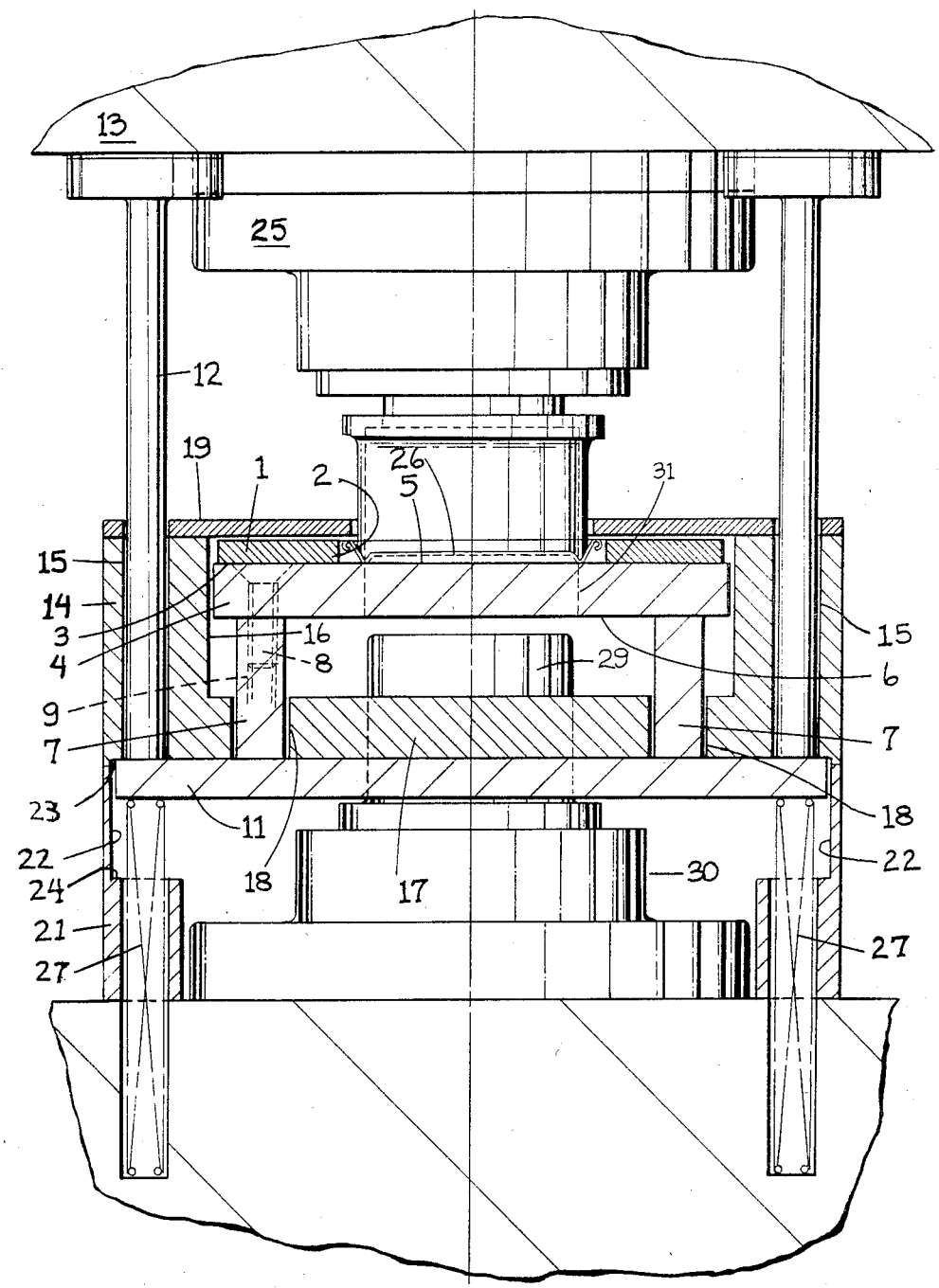
FIG. 2 is a side view of the present invention when the pad is in its normal position.
Figure 3:
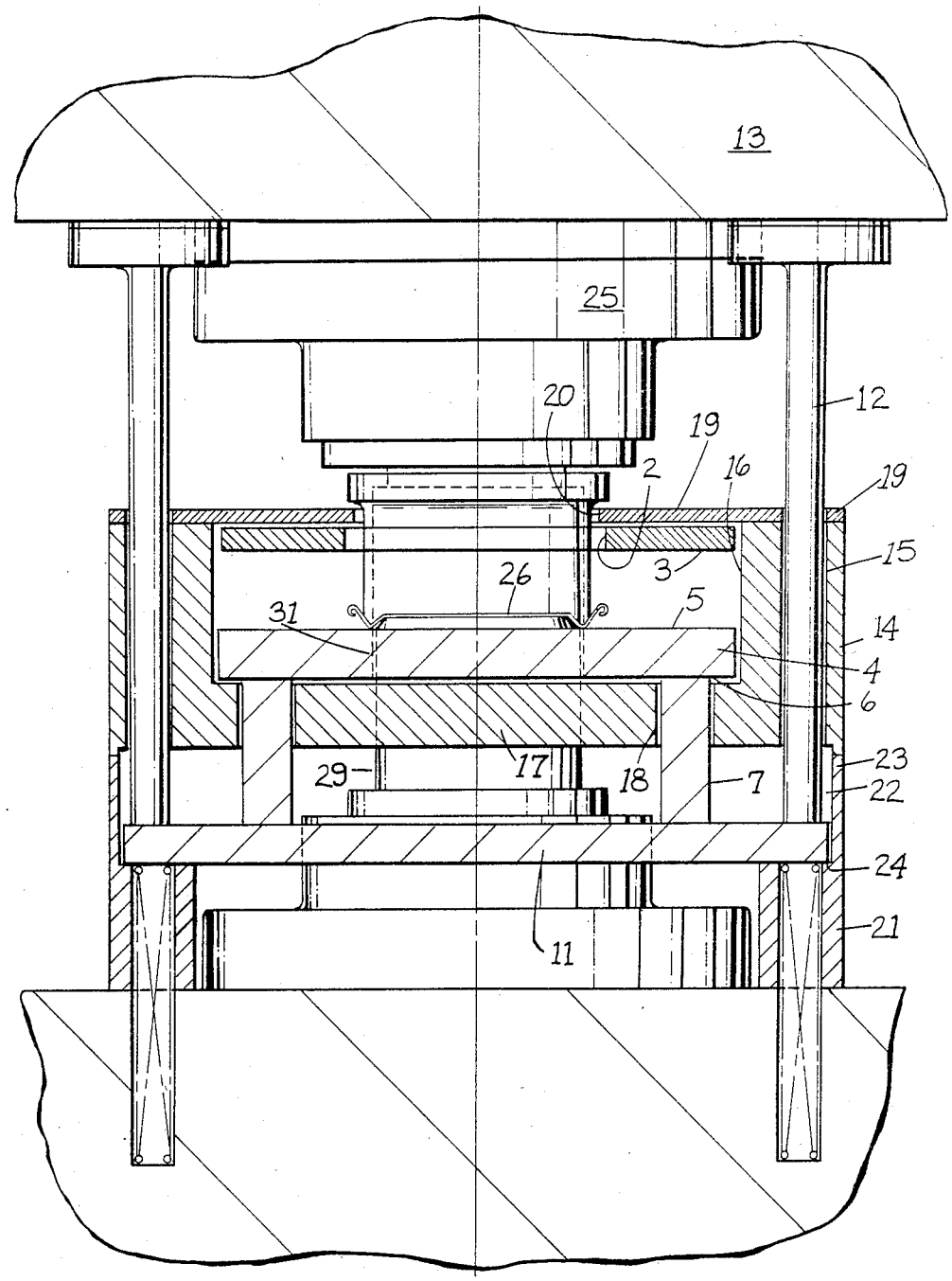
FIG. 3 is a side view of the present invention when the pad is fully displaced from the endless belt.

Positioned beneath the endless belt 1 and in contact with its lower surface 3, as shown in FIGS. 2 and 3, is a pad-like member 4 having an upper surface 5 and a lower surface 6. The pad 4 is not positioned beneath the entire length of the endless belt but is positioned beneath only the usable article transferring portion of the endless belt 1. Moreover, pad 4 does not move with the belt.

Depending upon the number of operation stations, the pad 4 is equipped with a similar number of orifices 31 shown in phantom in FIGS. 2 and 3. The orifices 31 are sufficiently small to prevent the article 26 from falling therethrough, yet are sufficiently large to permit an anvil 29, or other operation station equipment to pass upwardly therethrough so as to carry out the desired operation.

The pad 4 can be formed of any material so long as it is sufficiently strong to adequately support the plurality of articles placed upon the belt 1. For example, the pad could be made of a foam rubber material a metallic material.

Pad 4 is supported on its lower surface 6 by means of vertical uprights 7 which are positioned lengthwise near each end edge of the pad 4 as shown in all the figures. The pad is fastened to the vertical uprights 7 by a plurality of hex head bolts 8 which are counter sunk and bolted into a bore 9 (shown in FIG. 2).

The lower end portion of each vertical upright 7 terminates in a horizontal platform 11 which has a width wider than that of the endless belt 1. The upper outer edges of the horizontal platform are directly coupled to a pair of pad actuator pins 12 which are in direct communication with the upper die shoe 13. The lower outer edges of platform 11 are associated with one or more pairs of springs 27, which bias pad 4 upperwardly in its normal position.

Frame structure 14 includes a pair of vertical bores 15 through which the actuator pins 12 extend. Additionally, frame structure 14 includes an open upper central area 16 in which endless belt 1 and pad 4 extend in a lengthwise manner. The frame 14 includes a lower portion 17 which forms the lower surface of the central open area 16 and additionally contains a plurality of short bores 18 through which the vertical upright members 7 extend. The upper surface of the frame 14 is capped with a fixed plate 19 which has orifices 20 which are in substantial alignment with the orifices 2 of the endless belt 1. Note, however, orifices 20 are slightly smaller than apertures 2 so that articles 26 do not "pop out" of the belt during the transfer cycle. The lower leg portions 21 of frame 14 include a notch portion 22 which has an upper surface 23 in substantial alignment with the bottom surface of the lower portion 17. Notch 22 also includes a lower surface 24 so that in the normal position, the upper surface of the horizontal platform 11 is in direct contact with the lower surface of lower portion 17 and upper surface 23, and when the horizontal platform 11 is in the operational position, its bottom surface is in mating contact with lower surface 24. In this manner, the pad 4 operates between a position immediately beneath the endless belt 1, to a position immediately above the lower portion 17 of frame 14. The upper die shoe 13 is directly attached to an operational head 25 which is capable of performing a specific operational function at the operating station of the article feeding apparatus.

In operation, a pair of drums not shown cause endless belt 1 to rotate about the drums which causes the endless belt, illustrated in FIG. 1, to move in the direction of arrow A. At a point prior to the specific operating area discussed herein, a plurality of articles 26 are positioned within each aperture 2 of endless belt 1, and supported by pad 4. As the endless belt 1 approaches the operating area of the present invention, it travels beneath fixed plate 19 which prevents the articles from popping out. When it is desired to perform various operations on the articles, the upper die shoe begins to move downwardly causing actuator pin 12 to push downwardly upon horizontal platform 11, thereby causing pad 4 to move downwardly due to attachment of vertical upright members 7 to both the pad 4 and the platform 11. The upper die shoe 13 is in its full operational position at the same time pad 4 is in its lowermost position as illustrated in FIG. 3. At this point in the operation of the device, the lower surface of horizontal member 11 contacts the surface 24 of notch 22 such that surface 24 acts as a stop for the downward movement of pad 4. Moreover, anvil 29, which is mounted on foundation 30, now projects through pad 4 so that the articles 26 now rest upon the anvil 29.

Once the operating head 25 completes the operation upon the article 26, upper die shoe 13 retracts to its fully-opened position causing actuator pin 12 to be drawn upwardly which moves pad 4 in an upward direction carrying with it article 26. When the upper surface of horizontal platform 11 contacts the lower surface of lower portion 17 and upper surface 23 of groove 22, the upper die shoe is fully retracted and the endless belt 1 is once again activated and proceeds to carry the article 26 to the next operating station. As the endless belt 1 transports each article 26 to the operating head 25, the above-described operational procedure is conducted thereby uniformly repeating the same operation at each operating station on the plurality of articles 26 positioned within aperture 2 of the endless belt 1.

What is claimed is:

1. In an apparatus having an upper tool, an endless belt positioned beneath said upper tool and passing around at least two cylindrical drums, and having means for intermittently driving at least one of said drums for feeding a series of articles along a path so as to present them in succession to a plurality of operating stations where operations are performed on said articles in sequence, said belt having a series of equally spaced article receiving apertures slightly larger than said articles, said apparatus including a single pad positioned immediately beneath the endless belt to support said articles, said pad being supported by at least one vertical member, said vertical member being secured to a horizontal member in such a manner that said vertical member is positioned between said pad and said horizontal member, and means to move said pad in a vertical manner when desired, said means comprising at least one actuator pin, said acutator pin being secured at one end to said horizontal member and at an opposite end to said upper tool so that the vertical movement of said upper tool is synchronized with the vertical movement of said pad when performing various operations on each of the articles.

2. The apparatus of claim 1 further including a frame member having a central recessed portion in which said endless belt and said pad are positioned.

3. The apparatus of claim 2 in which said frame includes a lower portion positioned beneath said central recessed portion.

4. The apparatus of claim 3 in which said lower portion includes at least one vertical bore.

5. The apparatus of claim 4, wherein said vertical member extends through said vertical bore.

6. The apparatus of claim 2, wherein said frame includes at least one long vertical bore.

7. The apparatus of claim 6, wherein said actuating pin extends through said long vertical bore.

8. The apparatus of claim 3 in which said frame member includes at least one groove positioned below said lower portion.

9. The apparatus of claim 8, wherein said horizontal member has a portion thereof extending into said groove to act as an upper and lower limit on the vertical travel of said pad.

10. The apparatus of claim 1, wherein said pad has at least one orifice.

11. The apparatus of claim 10, further including a lower tool positioned beneath said pad, said lower tool projecting through said orifice of said pad when various operations are to be performed.

* * * * *